Oct. 16, 1951 J. B. SANDLER 2,571,949
HOT-WATER HEATER
Filed Nov. 10, 1948 2 SHEETS—SHEET 1
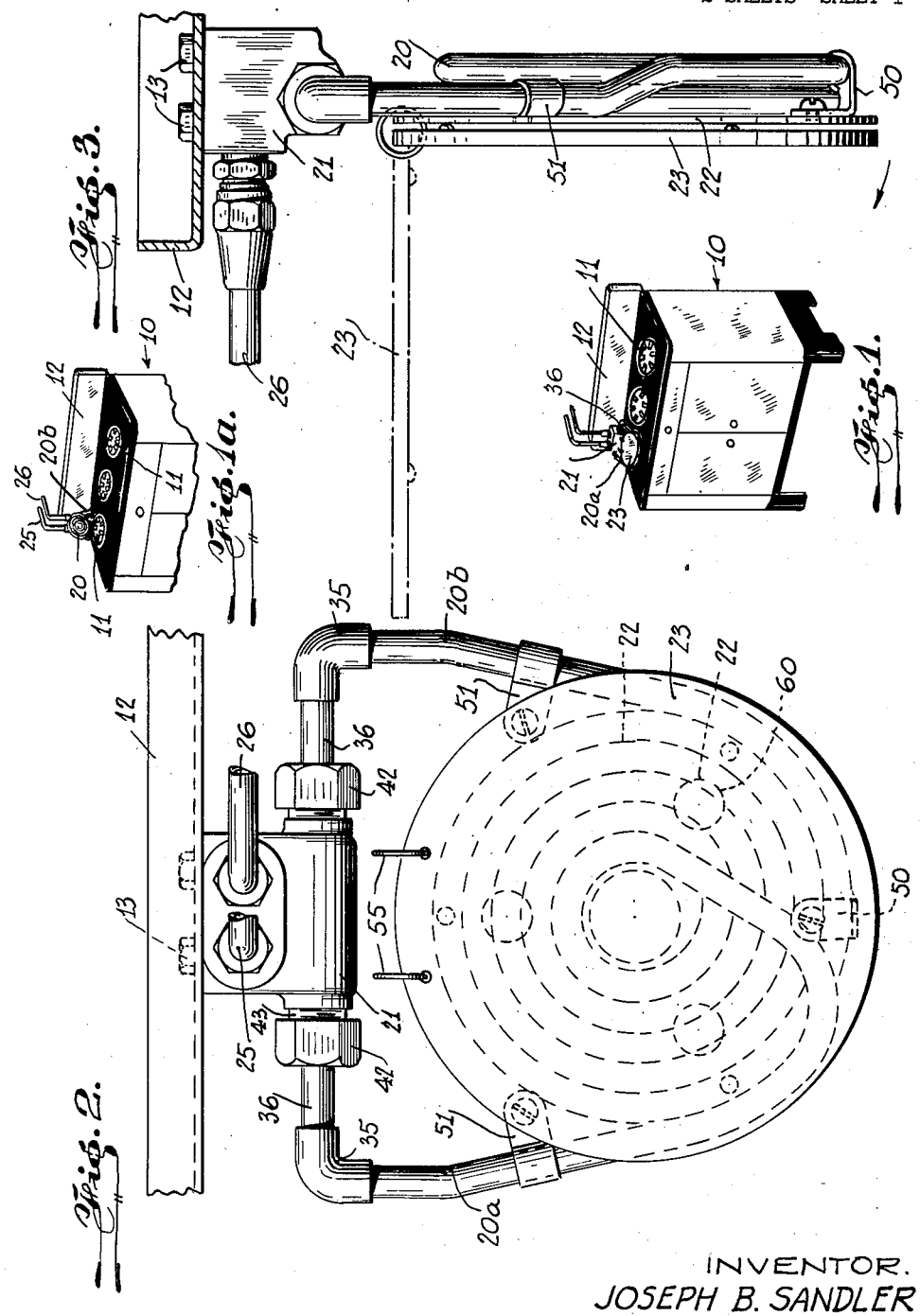
INVENTOR.
JOSEPH B. SANDLER.
BY
ATTORNEY.

Oct. 16, 1951   J. B. SANDLER   2,571,949
HOT-WATER HEATER
Filed Nov. 10, 1948
2 SHEETS—SHEET 2
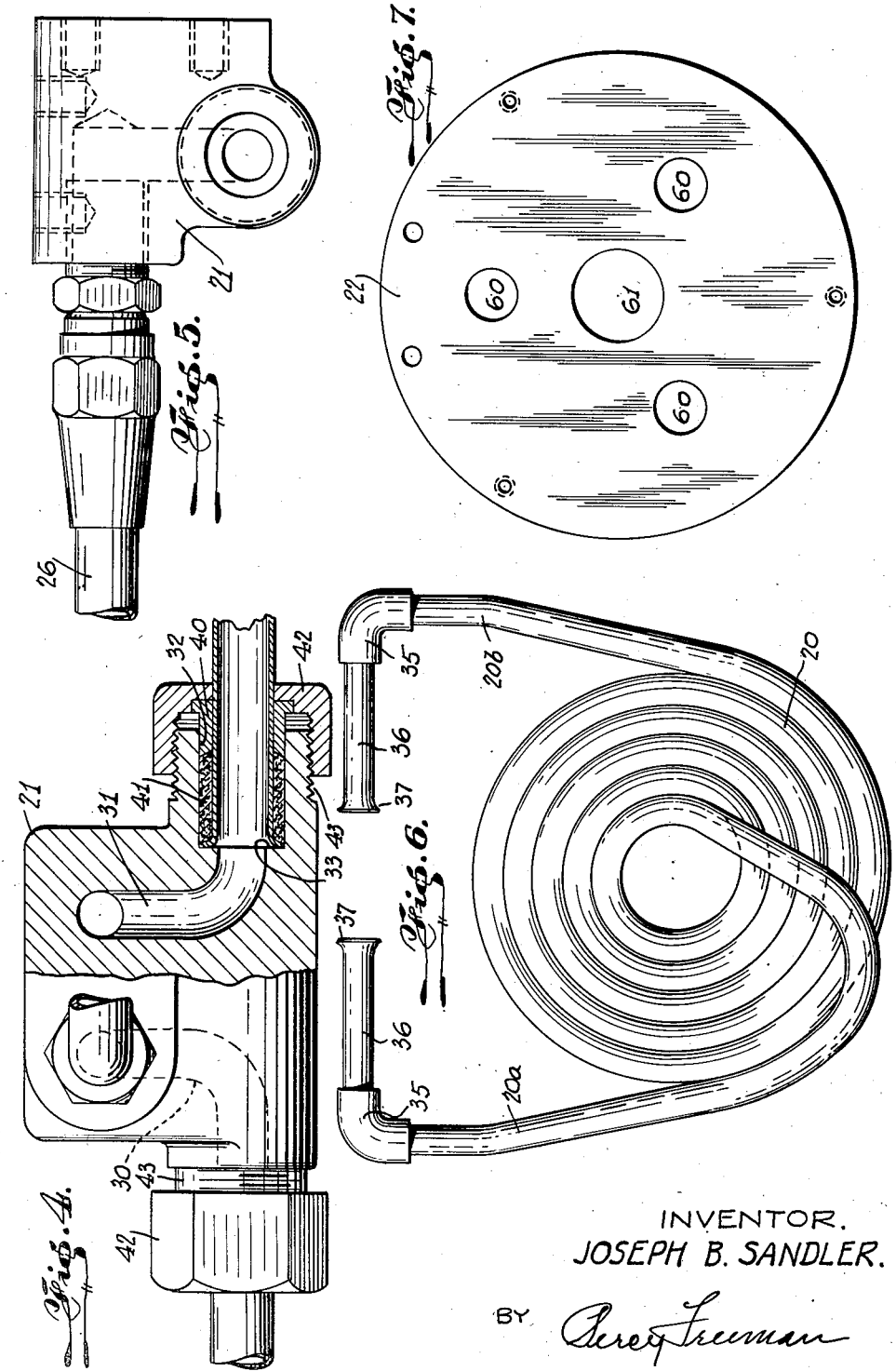
INVENTOR.
JOSEPH B. SANDLER.
BY Percy Freeman
ATTORNEY.

Patented Oct. 16, 1951

2,571,949

UNITED STATES PATENT OFFICE 2,571,949

HOT-WATER HEATER

Joseph B. Sandler, Flushing, N. Y.

Application November 10, 1948, Serial No. 59,255

1 Claim. (Cl. 126—53)

This invention relates to a water heater for small boats, trailers and other vehicles.

Although cooking facilities are provided in the galleys of small boats and in the kitchens of automobile trailers, facilities for heating water in any considerable quantity are generally non-existent in these quarters. Water heaters have heretofore been devised and patented to cooperate with the facilities to heat adequate quantities of water. These heaters have been pivotally mounted adjacent the burner of a cooking range, the idea being that they might be pivoted downwardly into overlying position with respect to the burner when it is desired to heat water, and that they might be swung upwardly and away from the burner when it is desired to use the burner solely for cooking purposes. Although these water heaters are based upon good theory, in practice they fail to provide satisfactory service. One of the basic reasons that underlies such unsatisfactory performance is the lack of a suitable pivotal connection between the water heater and the connecting water pipe system.

It is the principal object of this invention to provide a water heater of the character above described, which performs adequately and satisfactorily in every respect. A wholly novel and highly efficient pivotal connection is provided between the water heater and the water system so that the water heater may be swung into operative or inoperative position relative to the burner, with great ease and without the slightest risk of thereby causing leaks to occur between the heater and the water system.

Another object of this invention is the provision of a combination water heater and cooking element which makes use of the burner of a conventional cooking range for its source of heat. This combined unit may be used to heat water and to cook food at one and the same time by simply placing it in operative position above the cooking range burner and placing a suitable utensil containing food on said unit.

A corollary object of this invention is the provision of a combination water heater and hot plate or food warmer which may be used to heat water and to warm or keep warm foods contained in a utensil which is placed on the water heater when it is in operative position relative to the burner on the cooking range. In other words, although a hot flame may be used to quickly heat the water in the water heater, only a limited quantity of heat will be transmitted to the utensil, the quantity being sufficient merely to warm, or maintain warmth in, the food.

A preferred form of this invention is shown in the accompanying drawing, in which:

Fig. 1 is a perspective view of a cooking range on which the water heater herein claimed is shown to be mounted in operative position relative to one of the burners on said range.

Fig. 1a is a fragmentary view, similar to that of Fig. 1, but showing the water heater in elevated or inoperative position.

Fig. 2 is a plan view of the water heater and its fittings.

Fig. 3 is a side view thereof.

Fig. 4 is an enlarged plan view of the fitting on which the water heater coil pivots, said fitting being partly broken away and in section to show one of the pivotal connections between said fitting and said coil.

Fig. 5 is a side view of said fitting.

Fig. 6 is a plan view of the coil of said water heater.

Fig. 7 is a plan view of the hot plate which is affixed to said coil.

The water heater herein claimed may be mounted on a conventional cooking range 10 and it does not matter whether the heating medium is gas, electricity or any other kind of fuel such as kerosene, oil or alcohol commonly used in cooking ranges which are installed aboard ship or in an automobile trailer. The cooking range may have one or more burners 11 and a backboard 12 to which the water heater may be attached, as by bolts 13 shown in Fig. 3.

The water heater includes the following major elements: a coil 20, a fitting 21 on which said coil is pivotally mounted, a hot plate 22 which is affixed to said coil, and an asbestos plate 23 which is pivotally mounted on said hot plate. Fitting 21 of the water heater element is supported by bolts 13 on backboard 12 of the cooking range 10. It is connected by means of pipe 25 to a source of water supply such as a water tank and it is connected by means of pipe 26 to a water dispensing means such as a faucet in a wash basin or sink. Pipes 25 and 26 communicate, respectively, with L-shaped passages 30 and 31 formed in said fitting. As viewed in Fig. 4, the upper ends of said passages 30 and 31 lie in parallel lines but their lower ends extend along a common, axial line.

The co-axial portions of passages 30 and 31 are enlarged at their respective ends to form what may be designated as bores 32, thereby forming annular shoulders or seats 33 between them and their said bores 32. Bores 32 are also axially aligned.

It will be noted, especially in Fig. 6, that the two ends 20a and 20b of coil 20 are connected by means of elbows 35 to tubes 36 having flared ends 37. Tubes 36, like bores 32, are co-axial and it will be noted that when the water heater is assembled in the manner shown in Fig. 4, said tubular members 36 extend into bores 32, their flared ends 37 abutting annular shoulders 33. To prevent said tubular members 36 from becoming dislodged relative to bores 32 and more especially to shoulders 33 formed therein, packing glands 40 and packing 41 are provided. Packing gland nuts 42 are screwed to threaded portions 43 of fitting 21 to hold the packing glands tightly against the packing and thereby to press the packing 41 tightly against the flared ends 37 of tubular members 36.

It will be evident from the foregoing that tubular members 36 are free to rotate in bores 32. The contact of the flared ends of said tubular members with shoulders or seats 33 in said bores, combined with packing 41 therein, provides an effective water seal between said tubular members 36 and the fitting, irrespective of the angular position of said tubular members relative to said fitting.

It is by this means that the unit comprising the water coil 20 and the hot plate 22 and asbestos plate 23 mounted thereon may be pivoted into operative or inoperative position relative to the cooking range burner 11. When the coil and the hot plate, which is affixed thereto by means of brackets 50 and 51, are pivoted downwardly into overlying position with respect to the burner 11, a cooking utensil may be placed upon the hot plate to take advantage of the fire which is used to heat the water in the coil. In other words, the same fire that heats the water, at the same time also cooks the food. Should it be desired to utilize the burner solely for heating water, asbestos plate 23, which is pivotally connected to the hot plate by means of rings 55, may be swung downwardly into superimposed position relative to the hot plate. This would tend to prevent or at least to limit the escape of the hot gases which emanate from the burner and to confine them to the area in which the coil is disposed. The water heater would thus be operating at its highest efficiency. It will be understood that the asbestos plate does serve to transmit some of the heat of the gases of combustion which emanate from the burner. To the extent that it does so, it may be used to warm, or maintain warmth, in food contained in a utensil which is mounted on said asbestos plate. When a utensil is placed upon the asbestos plate there is no direct contact of the fire in the burner with said utensil. When the asbestos plate is swung into inoperative position (see Fig. 3) and the utensil is placed directly upon the hot plate 22, there is direct conduction of heat and actual direct contact between the fire and the utensil. This is effected through holes 60 and 61 formed in the hot plate (see Fig. 7).

The foregoing is descriptive of a preferred form of this invention and modifications may be incorporated therein in accordance with individual requirements and preferences without departing from the basic principles of the invention.

Having thus described my invention, what I claim as new and desire to secure by Letters Patent, is:

A water heater of the character described comprising a water heating coil which is provided with co-axial end portions having flared ends, said end portions being inwardly directed toward each other, a fitting having co-axial bores formed therein to receive both the flared end portions of the coil, packing glands in said bores for providing a water-tight seal between said flared end portions and the fitting, inlet and outlet pipes connected to said fitting, passages being formed in the fitting to provide communication, respectively, between said inlet and outlet pipes on the one hand and said bores and flared end portions on the other hand, said passages being of L-shape, said bores and said L-shaped passages being continuous with each other, the bores being enlarged extensions of said L-shaped passages, annular shoulders being formed between said bores and said passages which serve as bearings for the flared ends of the end pieces on the coil.

JOSEPH B. SANDLER.

REFERENCES CITED

The following references are of record in the file of this patent:

UNITED STATES PATENTS

| Number | Name | Date |
|---|---|---|
| 2,016,729 | Sweet | Oct. 8, 1935 |
| 2,155,567 | Sherrick | Apr. 25, 1939 |

FOREIGN PATENTS

| Number | Country | Date |
|---|---|---|
| 687,068 | France | Aug. 4, 1930 |
| 823,484 | France | Jan. 20, 1938 |
| 98,200 | Sweden | Feb. 20, 1940 |